United States Patent
Donald et al.

(10) Patent No.: US 6,228,258 B1
(45) Date of Patent: *May 8, 2001

(54) SEWAGE TREATMENT SYSTEM WITH CHLORINATOR

(76) Inventors: Hubbard H. Donald; George E. Johnson, both of 2247 Hwy. 151 North, Downsville, LA (US) 71234

( * ) Notice: Subject to any disclaimer, the term of this patent is extended or adjusted under 35 U.S.C. 154(b) by 0 days.

This patent is subject to a terminal disclaimer.

(21) Appl. No.: 09/360,033

(22) Filed: Jul. 23, 1999

Related U.S. Application Data

(60) Provisional application No. 60/093,823, filed on Jul. 23, 1998.

(51) Int. Cl.[7] ........................................................ C02F 3/20
(52) U.S. Cl. ...................... 210/195.3; 210/197; 210/202; 210/206; 210/256; 210/259
(58) Field of Search ............................ 210/195.1, 195.3, 210/195.4, 202, 206, 256, 258, 259, 523.2, 220, 197

(56) References Cited

U.S. PATENT DOCUMENTS

| | | | |
|---|---|---|---|
| 3,415,378 | * | 12/1968 | Fukuda ............................... 210/195.4 |
| 3,741,393 | * | 6/1973 | Estes et al. ......................... 210/195.4 |
| 4,608,157 | * | 8/1986 | Graves ................................ 210/532.2 |
| 4,650,577 | * | 3/1987 | Hansel ............................... 210/195.3 |
| 4,933,076 | * | 6/1990 | Oshima et al. ..................... 210/532.2 |
| 5,221,470 | * | 6/1993 | McKinney ......................... 210/195.4 |
| 5,490,935 | * | 2/1996 | Guy .................................... 210/195.3 |
| 5,492,635 | * | 2/1996 | Ball .................................... 210/532.2 |
| 5,549,818 | * | 8/1996 | McGrew, Jr. ...................... 210/195.4 |
| 5,667,689 | * | 9/1997 | Graves ................................ 210/195.4 |
| 5,879,550 | * | 3/1999 | Cox .................................... 210/195.4 |

OTHER PUBLICATIONS

Murphy Cormier, General Contractor "Don't Pollute Install a Hoot" brochure.*

* cited by examiner

Primary Examiner—Christopher Upton
(74) Attorney, Agent, or Firm—Phelps Dunbar, L.L.P.

(57) ABSTRACT

The Sewage Treatment System with Chlorinator ("STSC") processes sewage for buildings not connected to a municipal sewer system. It employs a two stage process for cleaning sewage in a single, light-weight, easy-to-install unit. Sewage is initially cleaned in the aerobic tank, which is divided into an inner chamber and an outer chamber by a funnel-shaped clarifier hanging down in the aerobic tank, with the opening in the bottom of the clarifier held above the bottom of the aerobic tank. Air droplines hang down in the outer chamber of the aerobic tank, so that sewage in the outer chamber is aerated, stimulating aerobic microorganisms which digest the sewage. The sewage in the outer chamber then moves into the inner chamber inside the clarifier where gravity separates solids from the effluent. This cleaned effluent is then drained to the post-treatment tank for the second cleaning stage, where it is chlorinated and stored for discharge. The post-treatment tank has a wedge-shaped bottom, for structural support, such that the post-treatment tank is deepest at the point of connection to the aerobic tank, sloping upward as it extends out. In addition, the post-treatment tank uses an outlet port which draws effluent from beneath the surface in the post-treatment tank, thereby ensuring proper mixing of the effluent to achieve homogeneous chlorination before discharge. The STSC uses a single cover to seal both tanks, adding structural support while simplifying manufacture. To reduce the weight, aiding in installation, while retaining the strength and durability needed for a sewage system, the STSC is generally made of fibreglass reinforced plastic, and the post-treatment tank is joined to the aerobic tank by a lamination process.

19 Claims, 4 Drawing Sheets

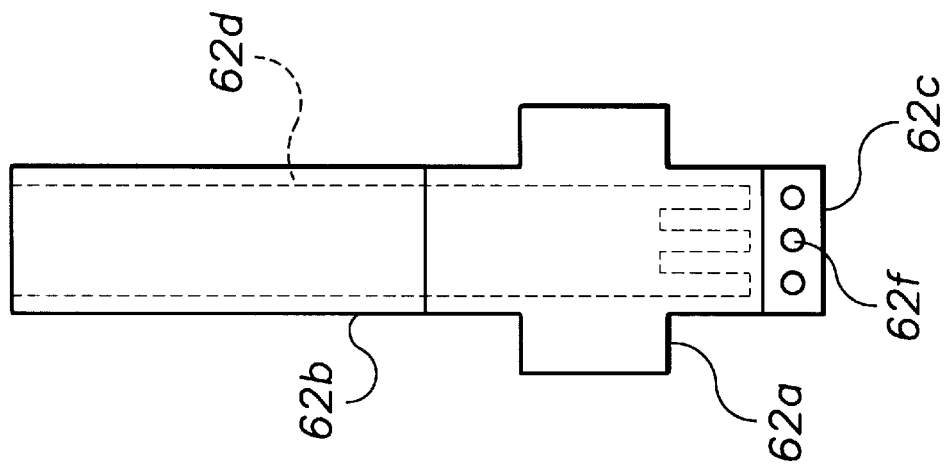
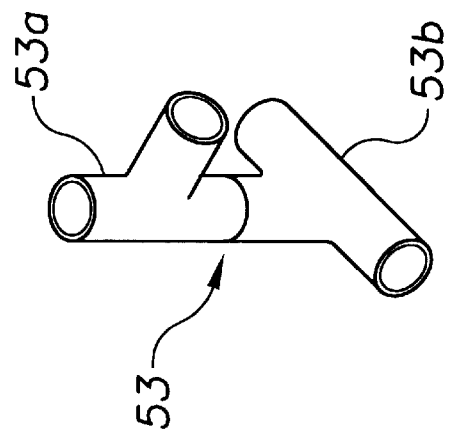
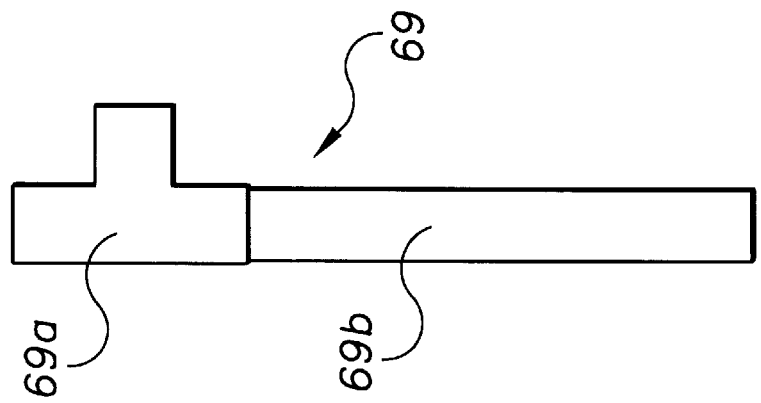

SEWAGE TREATMENT SYSTEM WITH CHLORINATOR

This application claims the benefit of Provisional Application 60/093,823, filed Jul. 23, 1998.

BACKGROUND OF THE INVENTION

This invention relates to the treatment of sewage. More particularly, this invention relates to the treatment of sewage discharged from houses and other buildings which are not connected to a municipal sewer system such that, after the sewage has passed through the Sewage Treatment System with Chlorinator ("STSC"), it has been cleaned to a level acceptable for discharge into the environment so that it will not contaminate the ground water. Thus, the STSC provides an alternative to septic systems for buildings constructed outside of a local municipal sewer system.

There are several versions of the conventional sewage treatment system which use aerobic microorganisms to break down sewage. One such device is seen in U.S. Pat. No. 5,549,818. This conventional sewage treatment device consists of a cylindrical tank which encompasses a funnel-shaped clarifier. The clarifier divides the cylindrical tank into an outer chamber, between the outer wall of the tank and the clarifier, and an inner chamber, inside the clarifier. Air is introduced into the outer chamber by multiple air droplines, which are connected to an air compressor and which pump air bubbles into the sewage in the outer chamber. Sewage flows into the outer chamber where it comes in contact with the air bubbles. The introduction of air facilitates the breakdown and digestion of the sewage by aerobic microorganisms present in the sewage. The aerated sewage then proceeds into the clarifier through an opening at the bottom of the funnel-shaped clarifier. Inside the clarifier is a quiescent zone. This area of calm in the inner chamber of the device allows for settling to occur, with the solids falling back out of the clarifier and collecting on the bottom of the treatment tank. Accordingly, the waste water becomes cleaner as it progresses upward in the funnel-shaped clarifier, continuing to allow gravity to separate the solids from the water. So, by the time the sewage has progressed up through the clarifier, it has been substantially cleaned. This treated effluent exits near the top of the clarifier and is discharged.

The Sewage Treatment System with Chlorinator ("STSC") employs a more comprehensive two step process to clean sewage. Thus, it is able to treat sewage more thoroughly than conventional devices while still offering a single, simple-to-install unit for this complete processing of sewage. The sewage first proceeds through an aerobic tank, passing through an aeration chamber followed by a settling chamber in a clarifier. Then, in the second stage, the sewage enters a post-treatment area, where it is chlorinated before discharge. Through this multi-step process, the STSC produces a cleaner effluent. In addition, the use of chlorine in the post-treatment tank disinfects the effluent before discharge, ensuring that no disease carrying organisms, which could contaminate the ground water, are discharged from the STSC.

SUMMARY OF THE INVENTION

The STSC is a single device utilizing a two stage procedure for treating sewage. The STSC is comprised of an aerobic tank, in which the sewage is aerated to allow aerobic microorganisms to break down the sewage and then clarified as the heavier particles separate from the effluent, and a post-treatment tank, which chlorinates the effluent before discharge. The two tanks are joined into a single unit, allowing for convenient installation.

The aerobic tank is a vessel with sidewalls and a bottom, and the top is sealed by a removable cover. The tank encompasses a funnel-shaped clarifier. The clarifier is wide near the top of the aerobic tank and narrows towards the bottom of the tank, and there is an opening in the bottom of the clarifier. There are many methods which could be used to hold the clarifier in place inside the aerobic tank. The STSC preferably uses a clarifier design with a lip that overhangs the sidewalls of the aerobic tank. Thus, the clarifier actually hangs down from the top of the sidewalls. The lip of the clarifier is held firmly in place between the top of the aerobic tank sidewalls and the cover for the aerobic tank. The funnel-shaped main body of the clarifier is offset slightly down from the top of the tank, so that there is a gap between the top of the clarifier and the top of the aerobic tank. This offset provides clearance for the air feed conduit. The clarifier hangs down inside the vessel, not reaching down to the bottom of the aerobic tank but leaving an area of clearance between the bottom of the clarifier and the bottom of the aerobic tank. Thus, the aerobic tank is divided into two chambers by the clarifier. Between the outer sidewalls of the aerobic tank and the clarifier is the outer chamber, where aeration of the sewage occurs, while the volume inside the clarifier is the inner chamber of the aerobic tank, where solid particles are gravity separated from the effluent.

Running down into the outer chamber of the aerobic tank from the top of the aerobic tank are droplines. These droplines are typically distributed in the outer chamber such that they provide for aeration throughout the upper part of the outer chamber, above the plane of the bottom of the clarifier. These droplines are conduits which are typically capped at the bottom end and which have small holes for emitting air. The top end of these droplines are connected to an air feed conduit which directs air from the compressor, so that the droplines will emit air bubbles into the outer chamber, aerating the sewage passing through the outer chamber of the aerobic tank. The inner chamber, located inside the clarifier, is screened from the aerating effect of the droplines by the walls of the clarifier, so this inner chamber is a non-turbulent, quiescent zone. Near the top of the inner chamber with its opening located inside the clarifier is an outlet drain leading to the post-treatment tank. Typically, the outlet drain is comprised of an outlet conduit, extending from the clarifier of the aerobic tank to the post-treatment tank, and a T-Baffle, which controls the flow of effluent into the outlet conduit. The T-Baffle is comprised of two T-joints. The first T-joint connects to the outlet conduit and extend upwards and downwards from the outlet conduit. The second T-joint connects to the bottom of the first T-joint, so that its two openings extend out perpendicularly from the openings of the first T-joint. The uppermost opening of the first T-joint extends above the fluid level within the clarifier, acting as a vent for the T-Baffle. Both of the openings for the second T-joint are beneath the fluid level within the clarifier. Thus, the effluent enters the T-Baffle through the two lower openings and then flows into the outlet conduit, out of the clarifier of the aerobic tank and into the post-treatment tank. Because a film of scum can form atop the liquid in the aerobic tank, the T-Baffle acts to drain effluent from beneath the surface of the fluid to provide for a cleaner effluent discharge from the aerobic tank.

The sewage enters the aerobic tank through an inlet port located near the top of the aerobic tank. The sewage moves into the outer chamber of the aerobic tank and descends downward through the outer chamber as additional sewage enters the aerobic tank through the inlet port. As the sewage descends, it passes through the air bubbles emitted from the drop lines. This excites the sewage, causing turbulent motion, as it aerates the sewage. Injecting air into the sewage activates and stimulates the aerobic microorganisms in the sewage. This causes the aerobic microorganisms to multiply and increases the amount of sewage that they digest. This aerobic process eliminates sewage contaminants to a great extent, cleaning the sewage. After passing through the aeration zone of the outer chamber of the aeration tank, the sewage enters a relatively calm zone below the air holes in the drop lines. Here, settling begins to occur, with heavier solids falling towards the bottom of the aerobic tank. The sewage in the quiescent zone is displaced upwards and through the opening in the bottom of the clarifier and into the inner chamber of the aerobic tank as more sewage enters the outer chamber of the aerobic tank. The sewage in the inner chamber is in a relatively calm state, and so contaminants, acted upon by gravity, will continue to settle downwards. In this way, the clarifier acts to screen out solid contaminants from the effluent. This continuous process results in a very clean effluent at the top of the inner chamber, where it is drained off by the T-Baffle and flows out of the aerobic tank through the outlet conduit and into the post-treatment tank.

The post-treatment tank has sidewalls and a bottom, and the top is sealed with a removable cover. Typically, the bottom is sloped such that the post-treatment tank is deeper on the side which connects to the aerobic tank and shallower farther away from the aerobic tank. This sloped, wedge-shaped bottom enhances the structural integrity of the joint between the post-treatment tank and the aerobic tank by distributing the forces in the joint such that they do not overcome the strength of the joint. The outlet conduit enters the post-treatment tank near the top of the tank. There, it connects to a chlorinator, through which the effluent passes into the storage space of the post-treatment tank. When passing through the chlorinator, the effluent is chlorinated, generally by flowing across one or more chlorine tablets. The cleaned effluent is held in the post-treatment tank until it rises to a level which forces the cleaned effluent out through an outlet port. Typically, the outlet port is located away from the chlorinator, on the opposite side of the post-treatment tank. The outlet port is comprised of a straight, vertical conduit with one end extending downward, beneath the surface of the effluent and with the other end extending upward, out of the effluent. From this straight, vertical conduit branches the outlet conduit, which leads out of the post-treatment tank. By drawing effluent from beneath the surface of the effluent in the post-treatment tank, the outlet port ensures that there is ample mixing time, so that the effluent is properly chlorinated before discharge. Proper chlorination is important because the chlorine acts as a disinfectant, eliminating any micro-organisms from the effluent before discharge to the environment and, thus, preventing any ground water contamination. Thus, when the effluent level in the post-treatment tank rises to a certain level, cleaned and chlorinated effluent will flow out of the post-treatment tank through the outlet port.

For convenience, the STSC connects the post-treatment tank to the aerobic tank, creating a single unit which performs this two stage cleaning process for sewage. The top of the two tanks are capped to make the STSC a closed system. The cover cap for the aerobic tank is generally convex in shape (dome-shaped). This strengthens the aerobic tank from collapsing under the weight of the earth beneath which it is buried. The cover cap for the post-treatment tank may not be convex, since it is primarily a riser which extends above the earthen surface and so does not need reinforcement. Rather than individual cover caps for each tank, however, a single cover for the entire STSC device is preferred. This single cover needs to be formed so that it seals each tank individually, so that there can be no sewage gas transfer between the tanks. In addition, chlorine cannot be allowed to flow from the post-treatment tank to the aerobic tank, as that would kill the aerobic microorganisms which are crucial to the cleaning process. The single cover is also preferably formed to incorporate a convex section over the aerobic tank for strength purposes. A portion of the cover for each tank can have a service hatch for maintenance. Generally, there is a riser extending from the top of the aerobic tank, allowing for inspection and cleaning of the aerobic tank. Also, there is generally a larger high riser on the post-treatment tank with a loose fitting cap that allows for venting of air from the system. This larger riser also allows access for maintenance of the chlorinator unit within the post-treatment tank.

The STSC can be made of any non-toxic, solid material, such as concrete, plastic, fibreglass, metal, or ceramic materials for example, but a strong, light-weight material is preferable for convenience in installation. Preferably, the STSC is formed of fibreglass reinforced plastic, keeping the weight of the STSC to that reasonable for simple installation without the need for lifting machinery. The tanks are typically joined together by a laminating process. The sloped, wedge-shaped bottom of the post-treatment tank is important in order to maintain the structural integrity of the laminated joint, preventing the post-treatment tank from being torn away from the aerobic tank due to the weight of the effluent within the post-treatment tank.

Generally, the tanks are sized so that they do not have to be pumped clean very often, on average requiring cleaning once a decade. In addition, the sizes of the tanks are dependant upon the expected amount of sewage generated by the buildings they service on a daily basis. The aerobic tank must also be sized so that the sewage remains in it long enough for the aerobic microorganisms to effectively process the sewage. The STSC is typically installed below ground, buried in the yard of a residence, so its compact design simplifies installation and minimizes the amount of damage to the yard.

It is an object of this invention to clean sewage in preparation for discharge. In doing so, this invention uses an aerobic processes to break down the sewage, separates the contaminants from the sewage water through a gravity separation process, and chlorinates the effluent. It is still another object of this invention for it to be easy to install and for it to be durable, requiring very little maintenance. It is yet another object of this invention to provide a two stage sewage cleaning process in a single, compact unit. It is yet another object of this invention to discharge water which meets or exceeds state water quality requirements. It is yet another object of this invention to allow for inspection of the tanks and to allow for cleaning and maintenance of the invention.

BRIEF DESCRIPTION OF DRAWINGS

Reference will be made to the drawings where like parts are designated by like numerals and wherein:

FIG. 3 is a side view of the outlet port of the STSC.

FIG. 4 is a perspective view of the T-Baffle of the STSC.

FIG. 5 is a side view of the chlorinator of the STSC.

DETAILED DESCRIPTION OF PREFERRED EMBODIMENT

Figure 1:
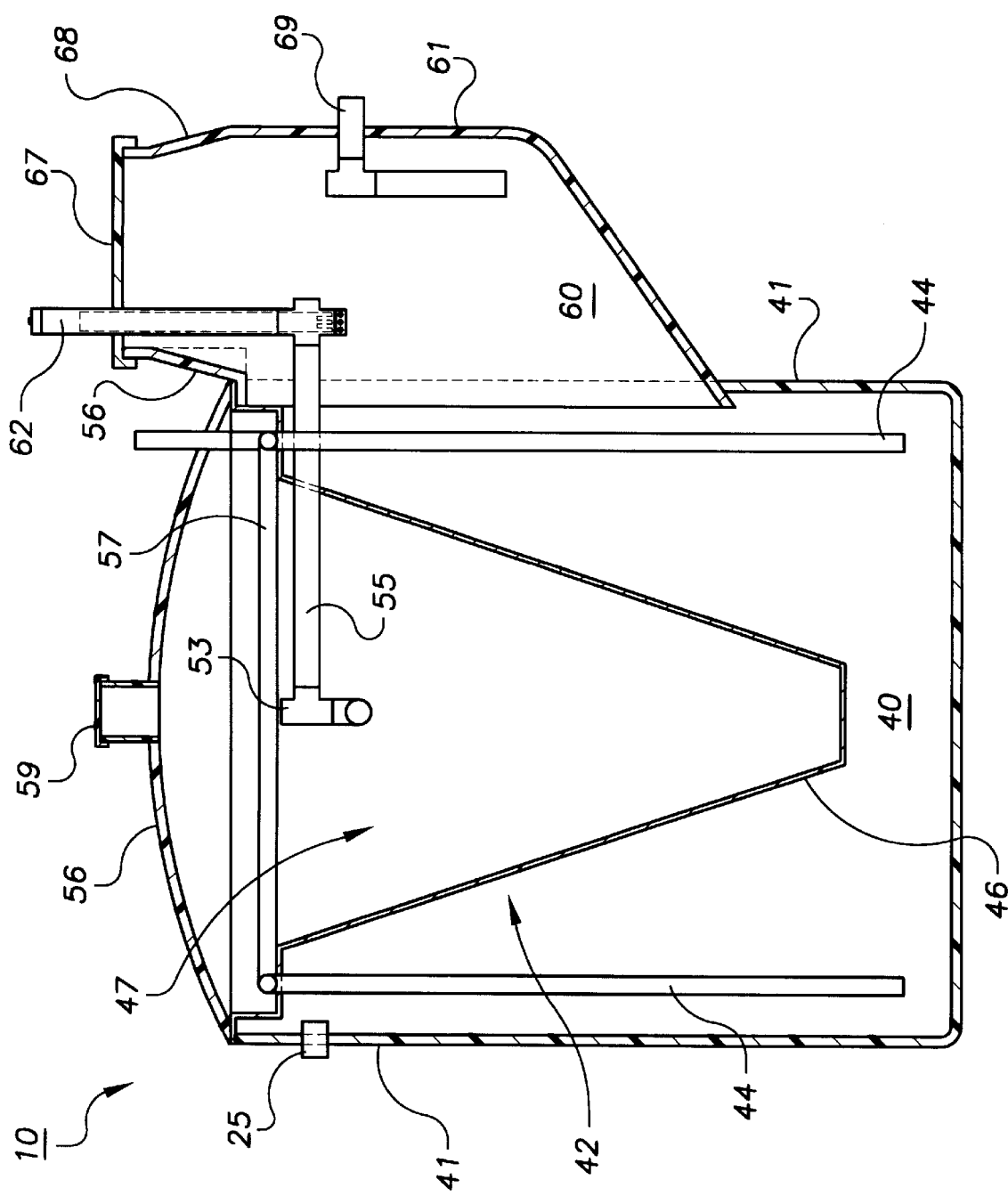
FIG. 1 is a side plan view of the STSC.
Figure 2:
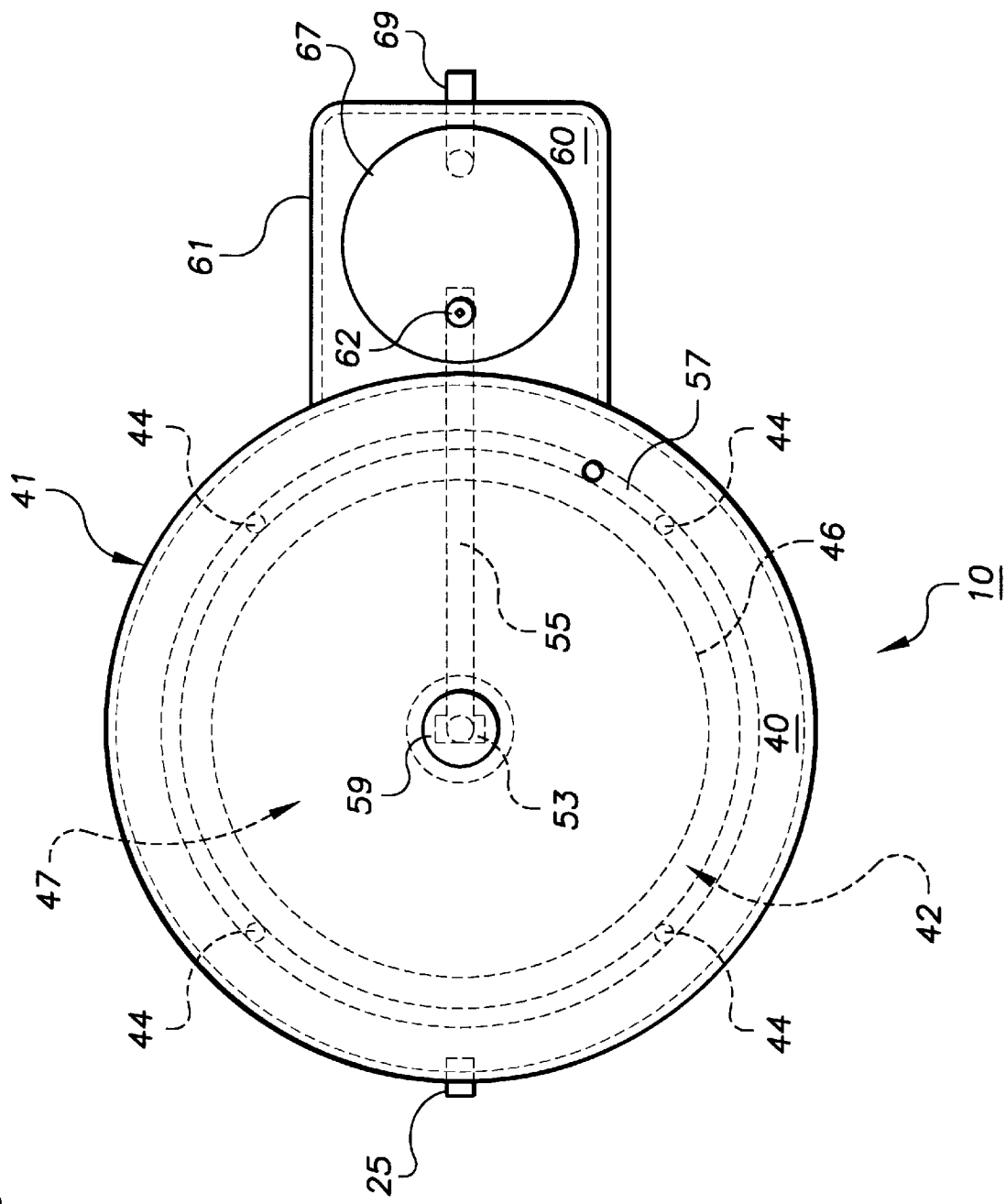
FIG. 2 is an overhead plan view of the STSC.

Referring now to the drawings in more detail, the preferred embodiment of the STSC is generally designated by the numeral 10.

The STSC 10 is comprised of two tanks which are rigidly joined together into a single unit. The main sewage treatment tank, which is generally the largest, is the aerobic tank 40. Although it may be any shape, the preferred embodiment is cylindrical with a closed bottom. Also, although the size of the aerobic tank 40 can vary depending upon the amount of sewage that the STSC 10 will likely receive, the aerobic tank 40 generally ranges from 500 to 1500 gallons, with the preferred embodiment holding 500 gallons. The post-treatment tank 60 is generally smaller than the aerobic tank 40. The post-treatment tank 60 typically ranges in size from 37 to 300 gallons, and in the preferred embodiment it holds 68 gallons. Again, the post-treatment tank 60 can have any shape so long as it has sidewalls and a bottom (so that it can contain the sewage), but in the preferred embodiment the post-treatment tank 60 is roughly rectangular in cross-section. The post-treatment tank 60 is rigidly attached to the aerobic tank 40, and in the preferred embodiment, the post-treatment tank 60 has a wedge-type bottom which slopes upward from its connection to the aerobic tank 40 such that the post-treatment tank 60 is deepest at the point of connection to the aerobic tank 40 and becomes more shallow as it extends outward from the aerobic tank 40. This wedge-shaped bottom strengthens the joint between the tanks 40 and 60. Although the aerobic tank 40 and the post-treatment tank 60 can be made of any non-toxic, solid material, in the preferred embodiment of the STSC 10 both tanks 40 and 60 are formed of fibreglass reinforced plastic, with the post-treatment tank 60 laminated onto the aerobic tank 40 to create a single, one-piece STSC 10.

Each of the tanks in the STSC 10 must be covered. The cover can be an integrated part of the tank, but generally the cover is a separate, distinct component to simplify both construction and maintenance. The top of the tanks can be sealed by having a separate cover for the aerobic tank 40 and for the post-treatment tank 60, or a single cover can seal both tanks at once. In the preferred embodiment, a single cover 56 is used to cap the aerobic tank 40 and the post-treatment tank 60. The cover 56 must seal each tank from the other to prevent any flow of gases between the two stages of the STSC 10. Also, in the preferred embodiment the cover 56 has a convexly curved portion over the aerobic tank 40, as this convex design strengthens the cover 56 so that it can resist the downward forces applied on it when it is buried beneath the ground.

Figure 6:
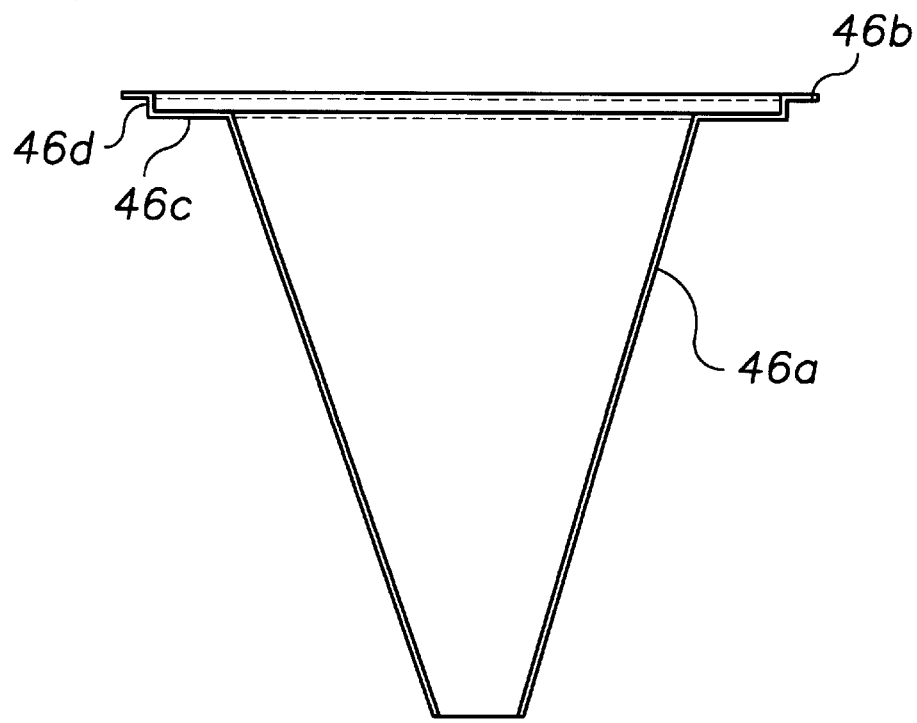
FIG. 6 is a cut-away side view of the clarifier of the STSC.
Figure 7:
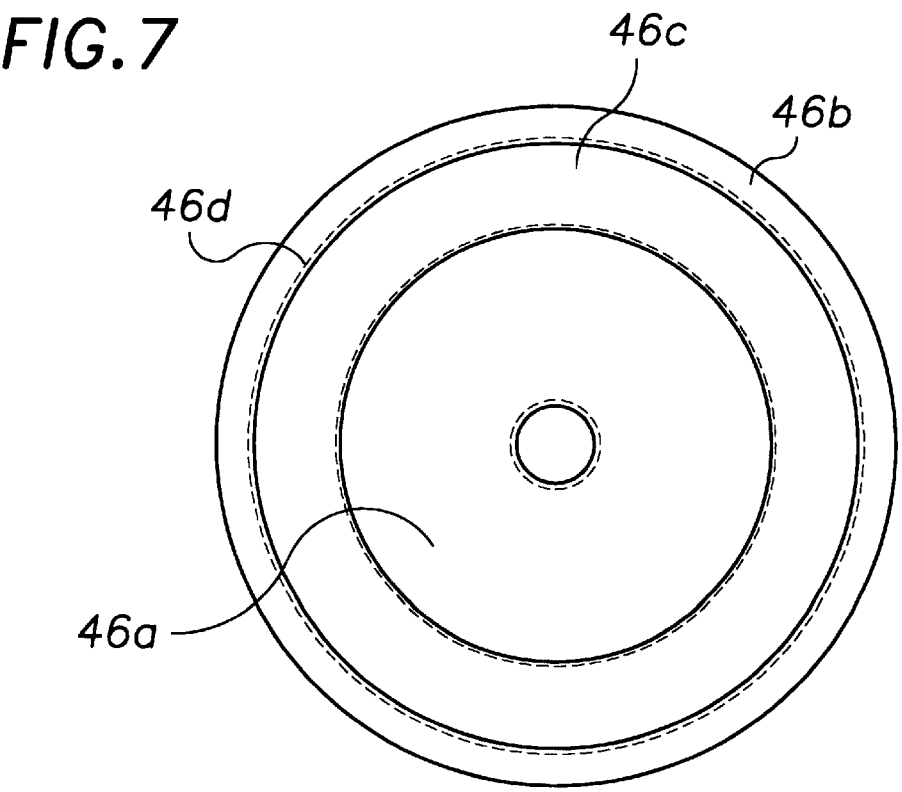
FIG. 7 is an overhead view of the clarifier of the STSC.

Sewage enters the aerobic tank 40 through an inlet port 25 generally located near the top of the aerobic tank 40. Within the aerobic tank 40 of the STSC 10, is a funnel-shaped clarifier 46. The clarifier 46 is wide near the top of the aerobic tank 40 and narrow near the bottom of the aerobic tank 40, with a hole in the bottom of the clarifier 46. The preferred embodiment uses a clarifier 46 design with a lip 46b that overhangs the sidewalls 41 of the aerobic tank 40 (see FIG. 6). Thus, the clarifier 46 actually hangs down from the top of the sidewalls 41. The lip 46b of the clarifier is held firmly in place between the top of the aerobic tank sidewalls 41 and the cover 56 for the aerobic tank 40. The funnel-shaped clarifier main body 46a is offset slightly down from the top of the tank, so that there is a gap between the top of the clarifier main body 46a and the top of the aerobic tank 40. This offset 46d provides clearance for the air feed conduit 57. Also, in the preferred embodiment, the clarifier main body 46a is set slightly in radially from the sidewalls 41 of the aerobic tank 40, providing a rim 46c on which the air feed conduit 57 may lie. The clarifier 46 hangs downward in the aerobic tank 40, but does not extend all the way to the bottom of the aerobic tank 40; instead there is a gap between the bottom of the clarifier 46, which is the small end of the funnel, and the bottom of the aerobic tank 40. Thus, the clarifier 46 divides the aerobic tank 40 into two chambers.

The outer chamber 42 of the aerobic tank 40 is located between the sidewall 41 of the aerobic tank 40 and the clarifier 46. The inner chamber 47, is located inside the funnel-shaped clarifier 46. Located in the outer chamber 42 of the aerobic tank, are one or more air droplines 44 which hang down into the sewage from the top of the aerobic tank 40. These droplines 44 are conduits, generally capped at the bottom ends, with holes for emitting air bubbles. In the preferred embodiment, the droplines 44 are cylindrical conduits. The top ends of the plurality of droplines 44 are connected to an air feed conduit 57 which leads to an external air compressor. Thus, when the air compressor is operating, air flows through the air feed conduit 57, into the droplines 44, and bubbles out into the sewage in the outer chamber 42 of the aerobic tank 40. For best results, the droplines 44 should not emit air bubbles beneath the plane of the bottom of the clarifier 46. While this may be accomplished by restricting the length of the droplines 44 so that they do not extend down beneath the plane of the bottom of the clarifier 46, the preferred embodiment uses droplines 44 which extend down past the bottom of the clarifier 46 but which only have holes in the area above the bottom of the clarifier 46. There should be enough droplines 44 to adequately aerate the sewage in the upper part of the outer chamber 42, with two through eight generally required. The preferred embodiment uses four such droplines 44 which are evenly spaced in the area of the outer chamber 42.

Located near the center of the inner chamber 47 near the top of the aerobic tank 40 is the T-Baffle 53. The T-Baffle 53 functions to draw cleaned effluent from near the top of the liquid surface level in the inner chamber 47 and to transport it through the outlet conduit 55 and into the post-treatment tank 60. The T-Baffle 53 is comprised of two T-joints 53a and 53b rigidly linked together (see FIG. 4). The lower T-joint 53b is located near the surface level, beneath the cleaned effluent so that cleaned effluent will enter through the two openings in the T-joint 53b. This lower T-joint 53b is rigidly attached to a branch of the upper T-joint 53a. One of the other branches of upper T-joint 53a extends up out of the effluent and acts as a vent. The third branch of the upper T-joint 53a is rigidly attached to the outlet conduit 55 which extends outward radially from the central location of the T-Baffle 53, through the outer sidewall 41 joining the aerobic tank 40 to the post-treatment tank 60, and into the post-treatment tank 60. Thus, the T-Baffle 53 and connected outlet conduit 55 transport effluent from the inner chamber 47 of the aerobic tank 40 into the post-treatment tank 60.

In the post-treatment tank 60, the outlet conduit 55 from the aerobic tank 40 is rigidly attached to a chlorinator 62. The purpose of the chlorinator 62 is to distribute chlorine into the effluent. In the preferred embodiment, the chlorinator 62 distributes chlorine by physical contact of the effluent with chlorine tablets. The chlorinator 62 is comprised of a cross 62a, an external feeding conduit 62b, a cap 62c with holes drilled in it, and a tablet droptube 62d (see FIG. 5). One branch of the cross 62a is rigidly joined to the outlet conduit 55 from the aerobic tank 40, and another extends outward horizontally into the post-treatment tank 60. The remaining branches of the cross 62a extend in the vertical plane, one branch extending upwards while the other extends downwards. To the upper branch of the cross 62a is connected an external feeding conduit 62b which extends upwards out of the post-treatment tank 60. It is through this external feeding conduit 62b that the chlorine tablets are administered. Rigidly attached to the lower branch of the cross 62a is a cap 62c. The cap 62c would act to prevent the flow of effluent into the post-treatment tank 60 except that the cap 62c has slots in it which allow for the effluent to pass through the cap 62c and into the post-treatment tank 60. The chlorine tablets are loaded into the chlorine droptube 62d, which is a straight conduit that has a small enough diameter to fit into the external feeding conduit 62b. The chlorine droptube 62d is then placed in the external feeding conduit 62c, loading the chlorine into the chlorinator 62. The chlorine droptube 62d has holes in it to allow effluent to pass through the sidewall of the chlorine droptube 62d, making contact with the chlorine tablet before exiting out the cap 62c and into the storage space of the post-treatment tank 60. The post-treatment tank 60 also contains an outlet port 69, generally located on the shallow side of the post-treatment tank 60 away from the chlorinator 62, which discharges the cleaned effluent out of the post-treatment tank 60. The outlet port 69 is generally comprised of a straight conduit 69b and a T-joint 69a (see FIG. 3). The top of the straight conduit 69b connects to one branch of the T-joint 69a. The bottom of the straight conduit 69b is located below the effluent level in the post-treatment tank 60, while the upper branch of the T-joint 69a, which extends vertically upward, opens above the effluent surface level to act as a vent. The remaining branch of the T-joint 69a, which is perpendicular to the other branches of the T-joint 69a, passes through the sidewall 61 of the post-treatment tank 60. The outlet port 69 discharges effluent at a level beneath the plane of the bottom of the chlorinator 62, ensuring that the effluent level in the post-treatment tank 60 remains beneath the plane of the bottom of the chlorinator 62. Thus, the outlet port 69 drains effluent from beneath the surface level for discharge, ensuring that only effluent which has had time to be properly mixed to enable uniform chlorination is discharged. In this way, by preventing effluent from progressing directly from the chlorinator 62 to the outlet port 69, the outlet port 69 design ensures that effluent is disinfected completely by chlorine before it is discharged from the STSC 10.

The single cover 56 which acts to seal both tanks 40 and 60 of the STSC 10 has various openings, risers, and hatches built into it. Over the aerobic tank 40, an inspection riser 59 extends up above ground level. Over the post-treatment tank 60, a post-treatment tank riser 68 extends up above ground level. This post-treatment tank riser 68 has a loose fitting cover for venting air and gases out of the STSC 10. The post-treatment tank riser 68 is sized to allow for easy access to the chlorinator 62 for maintenance purposes.

The invention described above employs a two stage procedure for cleaning raw sewage. The raw sewage enters the aerobic tank 40 through the inlet port 25, which has a sealant around it to prevent any leakage. As more sewage enters the aerobic tank 40 through the inlet port 25, sewage is displaced downward in the outer chamber 42 and passes through the air bubbles emitted from the droplines 44. These air bubbles aerate the sewage, stimulating the aerobic microorganisms so that the aerobic processing of the sewage is greatly enhanced. As the sewage continues to descend in the outer chamber 42, the sewage exits this aeration zone where the air bubbles are emitted by the droplines 44 and enters a quiescent zone near the bottom of the aerobic tank 40. In this quiescent zone, the solid contaminants suspended in the effluent begin to fall towards the bottom of the aerobic tank 40 under the influence of gravity. As more sewage enters the outer chamber 42 from the inlet port 25, the aerated sewage in the quiescent zone near the bottom of the aerobic tank 40 is pushed up into the inner chamber 47 inside the clarifier 46. The inner chamber 47 is protected by the walls of the clarifier 46 from the stirring effect of the air bubbles emitted from the droplines 44 in the outer chamber 42, so the inner chamber 47 is a zone of relative calm. As the sewage continues to rise upward through the inner chamber 47, the force of gravity continues to pull down the heavier solid contaminants. Thus, the inner chamber 47 acts as a gravity separator, continually segregating the contaminants from the effluent, so that by the time the treated sewage reaches the top of the inner chamber 47, the effluent has been substantially cleaned. Again, the size of the outer chamber 42 and the inner chamber 47 of the aerobic tank 40 are selected based upon the typical amounts of sewage to be processed so that each chamber has sufficient time to perform its cleaning function.

As the treated effluent nears the top of the inner chamber 47, it enters the two bottom openings in the T-Baffle 53. The effluent then flows through the outlet conduit 55, passing out of the inner chamber 47, through the clarifier 46, through the outer chamber 42, through the sidewall 41 of the aerobic tank 40 where it is adjacent to the post-treatment tank 60, and into the post-treatment tank 60. At the point where the outlet conduit 55 passes through the clarifier 46 and the side wall of the aerobic tank 40, a sealant ensures that there is no leakage. In the post-treatment tank 60, the outlet conduit 55 rigidly connects to the chlorinator 62. Thus, the effluent flows into the cross 62a, passes through holes in the chlorine droptube 62d to flow across a chlorine tablet, and then flows down through the holes in the cap 62c to exit the chlorinator 62, chlorinating the effluent before it enters the storage space in the post-treatment tank 60. In the preferred embodiment, the chlorinator 62 uses chlorine tablets designed to ensure that the chlorine content in the effluent passing across it will be at least 1 ppm. The treated effluent is stored in the post-treatment tank 60 until the level of effluent rises high enough so that the cleaned effluent flows out of the post-treatment tank 60 through the outlet port 69. The outlet port 69 drains effluent from beneath the surface in order to ensure proper mixing of the effluent and, thereby, homogeneous chlorination of the effluent before discharge.

As stated above, the preferred embodiment uses fibreglass reinforced plastic for the tanks 40 and 60, the clarifier 46, and the cover 56. This material selection allows the STSC 10 to be relatively light-weight, for ease of installation, yet durable. A strong, lightweight plastic would also be effective. The pipes, conduits, and T-joints in the preferred embodiment can also be made of any non-toxic, solid material, but the preferred embodiment uses commercially available PVC components since they are durable and light-weight and since their ready availability simplifies the manufacturing process. In addition, since each tank needs to be sealed to prevent transfer of liquids or gases between them and to prevent leakage of untreated sewage out of the STSC 10, sealant material is used wherever a conduit, pipe, or port passes through a separating wall. Generally, the tanks are sized appropriately depending on the expected sewage production rate of the buildings serviced by the STSC 10, with the size of the aerobic tank 40 being most critical to the sewage cleaning process since the aerobic microorganisms must be given sufficient time to process the sewage. In the preferred embodiment, the aerobic tank 40 holds approximately 500 gallons, while the post-treatment tank 60 holds approximately 68 gallons.

In the aerobic tank 40, the size of the gap between the opening in the bottom of the clarifier 46 and the bottom of the aerobic tank 40 should be big enough to allow for a good flow of sewage from the outer chamber 42 of the aerobic tank 40 into the inner chamber 47. In the preferred embodiment, the gap is approximately 10 inches. In addition, in the preferred embodiment the offset from the top of the aerobic tank 40 to the top of the clarifier main body 46*a* is approximately 3 inches. Also, the clarifier rim 46*c* in the preferred embodiment is approximately 9 inches.

Although the size, number, and distribution of air holes in the air droplines 44 can vary, the air holes should be as small as possible without clogging regularly in operation, since this will allow for good air diffusion into the sewage while allowing the STSC 10 to operate reliably. In the preferred embodiment the holes are 5/64th of an inch in diameter. Each dropline 44 in the preferred embodiment has three vertical columns of holes spaced 3/8th of an inch apart facing towards the clarifier 46 and running down the length of each dropline 44 from near the top of the aerobic tank 40 and ending just above the plane of the opening in the bottom of the clarifier 46. In the preferred embodiment, there are 13 holes in each dropline 44, with the holes in each column spaced 3/4th of an inch apart.

What we claim is:

1. A sewage treatment system comprising a chlorinator and a cylindrical aerobic tank, wherein said chlorinator and said aerobic tank are rigidly joined into a single unit and connected in series so that sewage flows from said aerobic tank to said chlorinator and wherein said aerobic tank and said chlorinator are fibreglass reinforced plastic.

2. A sewage treatment system as in claim 1 wherein said aerobic tank further comprises:
 a clarifier that divides said aerobic tank into an inner chamber and an outer chamber, one or more air droplines located within said outer chamber of said aerobic tank, and an outlet drain located within said inner chamber of said aerobic tank.

3. A sewage treatment system as in claim 2 wherein:
 said clarifier extends downward in said aerobic tank from near the top of said aerobic tank, whereby the bottom of said clarifier is approximately 10 inches above the bottom of said aerobic tank, and
 said one or more air droplines emit air bubbles in said outer chamber of said aerobic tank at or above the level of the plane of the bottom of said clarifier.

4. A sewage treatment system as in claim 2 wherein said clarifier further comprises:
 a funnel-shaped main body with top and bottom openings, and
 a lip around the top of said clarifier main body.

5. A sewage treatment system as in claim 1 further comprising a single cover which seals said aerobic tank and said chlorinator wherein the portion of said cover over said aerobic tank is domed.

6. A sewage treatment system comprising a cylindrical aerobic tank and a post-treatment tank;
 wherein said aerobic tank and said post-treatment tank are covered and are rigidly joined into a single unit and connected in series so that sewage flows from said aerobic tank into said post-treatment tank;
 wherein said post-treatment tank further comprises means for chlorinating the effluent flowing from said aerobic tank into said post-treatment tank:
 wherein said aerobic tank further comprises:
  an inlet port,
  a clarifier which divides said aerobic tank into an outer chamber and an inner chamber,
  one or more air droplines located within said outer chamber of said aerobic tank, and an outlet drain located within said inner chamber of said aerobic tank;
 wherein said clarifier further comprises:
  a funnel-shaped main body with top and bottom openings,
  a lip by which said clarifier overhangs the top of said aerobic tank, and
  an offset wherein said clarifier main body is held slightly below the level of said lip and whereby the top of said main body of said clarifier is below the top of said aerobic tank; and
 wherein said post-treatment tank further comprises an outlet port and a wedge-shaped bottom.

7. A sewage treatment system as in claim 6 wherein said clarifier further comprises a rim between said lip of said clarifier and said main body of said clarifier, such that said rim is separated from said lip by said offset.

8. A sewage treatment system as in claim 7 further comprising an air feed conduit and whereby:
 said air feed conduit transmits air to said air droplines, and
 said air feed conduit is located on said rim of said clarifier.

9. A sewage treatment system as in claim 8 wherein said air droplines in said outer chamber of said aerobic tank emit air bubbles into said outer chamber of said aerobic tank only at or above the level of the plane of the bottom of said clarifier.

10. A sewage treatment system as in claim 6 wherein a single cover seals said aerobic tank and said post-treatment tank.

11. A sewage treatment system as in claim 10 wherein the portion of said cover over said aerobic tank is domed.

12. A sewage treatment system comprising:
 a cylindrical aerobic tank and a post-treatment tank, wherein said aerobic tank and said post-treatment tank are rigidly joined into a single unit and are connected in series so that sewage which enters said aerobic tank then flows into said post-treatment tank;
 a single cover, wherein said aerobic tank and said post-treatment tank are sealed;
 said aerobic tank further comprising;
  an inlet port,
  a funnel-shaped clarifier with top and bottom openings,
  a plurality of air droplines containing holes, and
  an outlet drain,
 wherein said clarifier divides said aerobic tank into an inner chamber within said clarifier, and an outer chamber between the sidewalls of said aerobic tank and said clarifier; and further wherein said clarifier extends downward in said aerobic tank from near the top of said aerobic tank towards the bottom of said aerobic tank, leaving a gap between the opening in the bottom of said clarifier and the bottom of said aerobic tank such that sewage is able to flow from said outer chamber into said inner chamber of said aerobic tank;
 said post-treatment tank further comprising;
  means for chlorinating the effluent flowing into said post-treatment tank from aerobic tank through said outlet drain, an outlet port, and a sloped, wedge-shaped bottom such that said post-treatment tank is deepest at the point of connection to said aerobic tank and becomes shallower as it extends outward from said aerobic tank;

said clarifier further comprising a funnel-shaped main body, a lip, an offset, and a rim;

said air droplines being located in said outer chamber of said aerobic tank and emitting air bubbles into said outer chamber only at or above the level of the plane of the bottom of said clarifier, whereby beneath the level of the bottom of said clarifier there exists a quiescent zone of relatively calm sewage; and said outlet drain further comprising a T-Baffle and an outlet conduit, said T-Baffle being rigidly attached to the open end of said outlet conduit located within said inner chamber of said aerobic tank near the top of said inner chamber, whereby said outlet conduit directs effluent out of said inner chamber of said aerobic tank to said means for chlorinating effluent located within said post-treatment tank.

13. A sewage treatment system as in claim 12 wherein said lip overhangs the top of said aerobic tank, said offset connects said lip to said rim, and said rim connects said offset to said main body of said clarifier.

14. A sewage treatment system as in claim 13 further comprising an air feed conduit and whereby:

said air feed conduit transfers air to said air droplines, and said air feed conduit is located on said rim of said clarifier.

15. A sewage treatment system as in claim 12 wherein said aerobic tank and said post-treatment tank are constructed of fibreglass reinforced plastic and wherein the means for connecting said post-treatment tank to said aerobic tank is by lamination.

16. A sewage treatment system as in claim 15 wherein said outlet port in said post-treatment tank is located on the opposite sidewall of said post-treatment tank from the connection to said aerobic tank.

17. A sewage treatment system as in claim 15 wherein said outlet port draws effluent from beneath the surface level of effluent in said post-treatment tank and discharges said effluent from said post-treatment tank.

18. A sewage treatment system as in claim 15 wherein the portion of said cover over said aerobic tank is domed.

19. A sewage treatment system as in claim 12 wherein the portion of said cover over said aerobic tank is domed.

* * * * *